(12) United States Patent
Darling et al.

(10) Patent No.: US 11,966,791 B2
(45) Date of Patent: *Apr. 23, 2024

(54) SYSTEMS AND METHODS FOR DEVELOPING A WEB APPLICATION USING MICRO FRONTENDS

(71) Applicant: Capital One Services, LLC, McLean, VA (US)

(72) Inventors: Jonathan Michael Darling, Richardson, TX (US); Dustin Nation, The Colony, TX (US); Jibins Joseph, Prosper, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/304,973

(22) Filed: Apr. 21, 2023

(65) Prior Publication Data
US 2023/0251906 A1    Aug. 10, 2023

Related U.S. Application Data

(63) Continuation of application No. 17/653,197, filed on Mar. 2, 2022, now Pat. No. 11,663,046, which is a
(Continued)

(51) Int. Cl.
*G06F 9/50* (2006.01)
*G06F 8/30* (2018.01)
(Continued)

(52) U.S. Cl.
CPC .............. *G06F 9/505* (2013.01); *G06F 8/30* (2013.01); *G06F 8/36* (2013.01); *G06F 8/70* (2013.01)

(58) Field of Classification Search
None
See application file for complete search history.

(56) References Cited

U.S. PATENT DOCUMENTS

| 7,546,576 B2 | 6/2009 | Egli |
| 10,038,736 B2 | 7/2018 | Veeravalli et al. |

(Continued)

OTHER PUBLICATIONS

Benjamin Johnson, "Exploring micro-frontends," Medium (18 pages).
(Continued)

*Primary Examiner* — Qing Chen
(74) *Attorney, Agent, or Firm* — Bookoff McAndrews, PLLC

(57) ABSTRACT

Disclosed are systems and methods for developing a web-based application using micro frontends. A web application architecture system may include a plurality of web servers and a plurality of single page applications. Each one of the plurality of single page applications may be hosted on a single respective one of the plurality of web servers. The web application architecture system may further include one or more shared libraries that are accessed by each of the plurality of single page applications. The one or more shared libraries may include shared interface components for each of the plurality of single page applications such that the plurality of single page applications are a part of a single web-based application. Additionally, the web application architecture system may include a load balancer configured to route traffic to each of the plurality of single page applications.

20 Claims, 4 Drawing Sheets

Related U.S. Application Data continuation of application No. 16/881,203, filed on May 22, 2020, now Pat. No. 11,288,103, which is a continuation of application No. 16/290,676, filed on Mar. 1, 2019, now Pat. No. 10,678,600.

(51) Int. Cl.
*G06F 8/36* (2018.01)
*G06F 8/70* (2018.01)

(56) References Cited

U.S. PATENT DOCUMENTS

| | | |
|---|---|---|
| 2008/0250323 A1 | 10/2008 | Huff |
| 2010/0262678 A1 | 10/2010 | Morgan et al. |
| 2011/0055912 A1 | 3/2011 | Fusari et al. |
| 2011/0090532 A1 | 4/2011 | Watanabe |
| 2012/0254714 A1 | 10/2012 | Peters et al. |
| 2014/0289817 A1 | 9/2014 | Matsushima |
| 2015/0052498 A1 | 2/2015 | Chauhan et al. |
| 2015/0278171 A1 | 10/2015 | Lefebvre et al. |
| 2016/0100030 A1 | 4/2016 | Brown et al. |
| 2017/0034306 A1 | 2/2017 | Thangeswaran |
| 2017/0353620 A1 | 12/2017 | Tokiwa et al. |
| 2019/0303500 A1 | 10/2019 | Mathews |

OTHER PUBLICATIONS

Rufus, Vinci "Microfrontends: An approach to building Scalable Web Apps," Sep. 2, 2018, p. 1-6. (Year: 2018).

SYSTEMS AND METHODS FOR DEVELOPING A WEB APPLICATION USING MICRO FRONTENDS

CROSS-REFERENCE TO RELATED APPLICATION(S)

This patent application is a continuation of and claims the benefit of priority to U.S. Nonprovisional patent application Ser. No. 17/653,197, filed Mar. 2, 2022, now U.S. Pat. No. 11,663,046, which is a continuation of U.S. Nonprovisional patent application Ser. No. 16/881,203, filed May 22, 2020, now U.S. Pat. No. 11,288,103, which is a continuation of U.S. Nonprovisional patent application Ser. No. 16/290,676, filed on Mar. 1, 2019, now U.S. Pat. No. 10,678,600, the entireties of all of which being incorporated herein by reference.

TECHNICAL FIELD

Various embodiments of the present disclosure relate generally to web applications and, more particularly, to systems and methods for developing web applications using micro frontends.

BACKGROUND

A web-based application (web-app) is a software application that runs on a remote server. Web browsers are typically used to access and allow users to interact with the web application over a network, such as the Internet. Traditionally, web-based applications are developed using a monolithic architecture. A monolithic web-based application is built as a single unit comprising an application program interface (API) layer, a web server, and a web-app such as a single page application (SPA). The API layer is used to provide data access to the web-app. For example, the API layer may use various data transport methods, such as HTTP (REST), GraphQL, WebSockets, or the like. The API layer may include one or more servers written in one or more languages. The web server serves static content for consumption by the web browser and maps URLs to content on the file system. The web server further proxies requests to the API layer. Web servers may include NGINX, Apache, or the like. The web-app, or SPA, is the web site that the user interacts with via a web browser and includes HTML pages and/or JavaScript running in the web browser. The SPA makes requests to the web server for data and uses the data to build and/or populate web pages. Various frameworks may be used to develop the SPA.

Traditional monolithic web user interfaces (UIs) of web-based applications can quickly grow to a massive scale. This may cause scalability issues due to the raw file size and resultant download and compile times to deploy the web-app. Maintainability issues may also exist due to the inherent complexity of a large code-base, and the risks associated with releasing a large code-base. Large code-bases also do not have clear dividing lines, leading to overlap of multiple concurrent developers, thus decreasing productivity and increasing risk of defects.

Micro frontends provide a solution to the problems associated with the traditional monolithic web-based applications. Micro frontends are small pieces of a web-app. For example, micro frontends may be a single workflow of the web-app, a single feature of the web-app, or a single widget of the web-app. Further, micro frontends can be independently developed and deployed by separate development teams. Micro frontends may be complimentary such that, when combined together, the micro frontends form a feature-rich web-app. Currently, micro frontends have been implemented using two methods.

The first method involves developing the micro frontends (e.g., workflows, features, or widgets) independently as modules having self-contained functionality and the modules can be imported into a larger web application shell. In this method, the modules are bundled together by a bootstrapper application into a host web-app during compile time and then are deployed as one single unit. The host web-app provides app-wide, common functionality. However, there are multiple disadvantages to this approach of using micro frontends. First, only a single frontend framework can be used in this approach, and may even be limited to a single version of the single frontend framework. This makes it difficult to move the application to future technologies. Second, there is only one single point of failure in the bootstrapper application. Third, all of the modules have to be deployed at once, even if only some modules are changed or modified. For example, deploying a module requires the entire application to be rebuilt and redeployed.

The second method also involves developing the micro frontends (e.g., workflows, features, or widgets) independently as modules. In this method, the modules are hosted on a web server and are bundled together by a bootstrapper application during run time, removing the deployment issue of the first method. However, there are multiple disadvantages to this approach of using micro frontends as well. First, similar to the first method, only a single frontend framework can be used in this approach, and may even be limited to a single version of the single frontend framework. Second, also similar to the first method, there is only one single point of failure in the bootstrapper application.

The systems and methods of the present disclosure may solve one or more of the problems set forth above and/or other problems in the art. The scope of the current disclosure, however, is not defined by the attached claims, and not by the ability to solve any specific problem The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, systems and methods are disclosed for developing web applications using micro frontends. Each of the examples disclosed herein may include one or more of the features described in connection with any of the other disclosed examples.

In one embodiment, a web application architecture system is disclosed. The web application architecture system may include: a plurality of web servers; a plurality of single page applications, wherein each one of the plurality of single page applications is hosted on a single respective one of the plurality of web servers; one or more shared libraries that are accessed by each of the plurality of single page applications, wherein the one or more shared libraries include shared interface components for each of the plurality of single page applications such that the plurality of single page applications are a part of a single web-based application; and a load balancer configured to route traffic to each of the plurality of single page applications.

In another embodiment, a method for developing a web application is disclosed. The method may include: developing a plurality of single page applications, wherein each one of the plurality of single page applications is hosted on a single respective one of a plurality of web servers; accessing one or more shared libraries to provide shared interface components for each of the plurality of single page applications such that the plurality of single page applications are a part of a single web-based application; and routing traffic to each of the plurality of single page applications by a load balancer.

In yet another embodiment, a web application architecture system, comprising: a plurality of web servers; a plurality of single page applications developed using one or more frameworks, wherein each one of the plurality of single page applications is hosted on a single respective one of the plurality of web servers and each one of the plurality of single page applications includes a different URL sub-directory of a single root URL; one or more shared libraries that are accessed by each of the plurality of single page applications, wherein the one or more shared libraries include shared interface components for each of the plurality of single page applications such that the plurality of single page applications are a part of a single web-based application having the single root URL; and a load balancer configured to route traffic to a respective one of the plurality of single page applications based on the URL sub-directory of the respective one of the plurality of single page applications.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
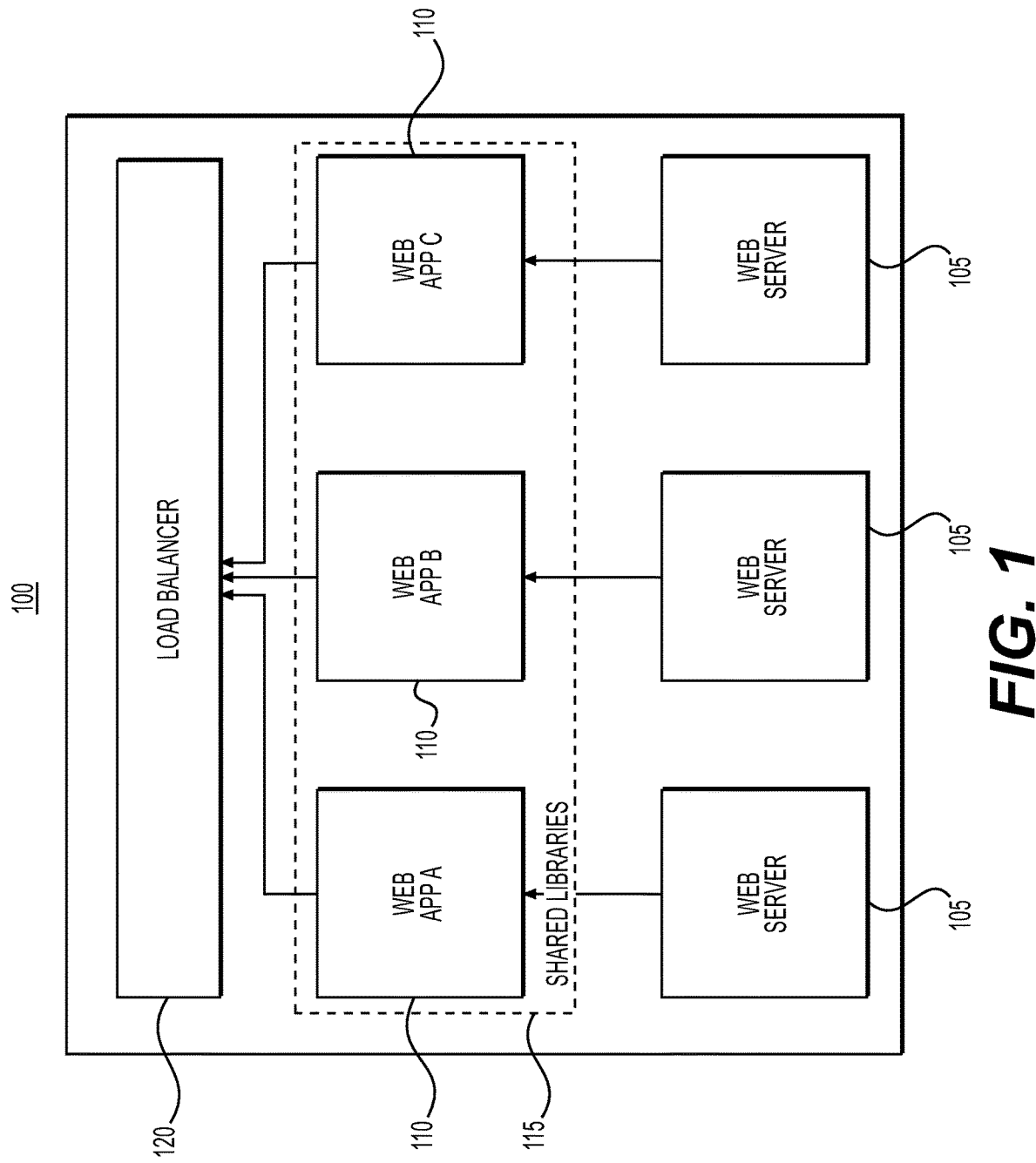
FIG. 1 depicts an exemplary web application architecture system, according to one or more embodiments.

Various embodiments of the present disclosure relate generally to web applications and, more particularly, to systems and methods for developing web applications using micro frontends.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure provides for systems and methods for developing a web application using micro frontends. As used herein, "micro frontends" are small pieces of a web-based application, such as a single workflow, a single feature, or a single widget, that can be independently developed and deployed and when combined together, form a feature-rich web-based application. Specifically, embodiments of the present disclosure provide for utilizing multiple small UIs, each responsible for a single function, to form a larger web-based application. Embodiments provided herein may leverage multiple discrete single page applications (SPAs), each independently hosted on their own web server. A load balancer may be utilized to route traffic (via URL path) to each individual SPA of the web-based application. Cross-cutting concerns may be encapsulated in shared libraries.

Embodiments of the present disclosure may provide several advantages. For example, embodiments of the present disclosure may allow for each micro frontend to be completely independently developed and deployed as there is no need for a bootstrapping application to tie individual pieces together. Further, embodiments of the present disclosure may include no limitations for the UI framework, which may allow for more flexibility, maintainability, and future upgradability. For example, each development team may utilize a different framework for each of the different SPAs.

FIG. 1 depicts an exemplary web application architecture system 100, according to one or more embodiments. As shown in FIG. 1, web application architecture system 100 may include a plurality of web servers 105, a plurality of single page applications (SPAs) 110, and a load balancer 120. Each one of the plurality of SPAs 110 may be hosted on a single respective one of the plurality of web servers 105. The plurality of SPAs 110 may include, for example, SPA A, SPA, B, SPA C, etc. The web application architecture system 100 may further include one or more shared libraries 115. The one or more shared libraries 115 may include shared interface components for each of the plurality of SPAs 110. Each of the SPAs 110 may access the one or more shared libraries 115 to utilize the shared interface components such that the plurality of SPAs 110 are a part of a single web-based application. The load balancer 120 may be configured to route traffic to each of the plurality of SPAs 110. Thus, each of the plurality of SPAs 110 may be a different page (e.g., a different user interface) of the single web-based application.

Each of the plurality of web servers 105 may host a respective one of the SPAs 110, as described above. The plurality of web servers 105 may include server software and/or hardware dedicated to running the server software. The plurality of web servers 105 may store, process, and deliver SPAs 110 of the single web-based application to users via a web browser through a network. For example, each of the plurality of web servers 105 may receive incoming network requests over HTTP or other related protocols. The plurality of web servers 105 may include, for example, NGINX®, Apache®, Google Web Server (GWS), or any other type of web server 105 for hosting SPAs 110.

The plurality of SPAs 110 may each include a single user interface of the single web-based application. For example, each of the plurality of SPAs 110 may be a different page of the single web-based application. As such, the single web-based application may include a single root URL and the plurality of SPAs 110 may each include a different sub-directory of the single root URL. The plurality of SPAs 110 may be developed using one or more frameworks. In some embodiments, each of the plurality of SPAs 110 may be developed using a different framework. The one or more frameworks may include, for example, Angular, React, Vue, Meteor, Ember, Aurelia, or any other framework for developing SPAs. In one embodiment, the plurality of SPAs 110 may include a first SPA 110 developed using a first framework and a second SPA 110 developed using a second framework, where the second framework is different than the first framework. For example, the first SPA 110 may be developed using Angular and the second SPA 110 may be developed using React.

The one or more shared libraries 115 may provide shared functionality for each of the plurality of SPAs 110 such that the plurality of SPAs 110 are a part of the single web-based application. Cross cutting concerns may be encapsulated by the one or more shared libraries 115. As such, each of the plurality of SPAS 110 may access the one or more shared libraries 115 for shared interface components of the web application. For example, the one or more shared libraries 115 may include shared user interface components, shared platform software development kit (SDK) components, shared web application shell components, and/or shared authentication utilities components of the single web-based application. The shared user interface components may include a shared style library for providing shared styles of the single web-based application for each of the plurality of SPAs 110. The platform SDK components may include shared services used by each of the SPAs 110 of the single web-based application, such as SiteCatalyst®, Adobe® Target, User Information, or the like. The web application shell components may include smarter components that create the shell of the single web-based application, such as the header and footer of the single web-based application. The authentication utilities components may include shared functionality for authentication for each of the SPAs 110, such as route guards and HTTP interceptors. In some embodiments, web application architecture system 100 may utilize local storage for data sharing between the plurality of SPAs 110. For example, local or session storage may be used in a respective web browser database to transfer more complete data between the plurality of SPAs 110.

The load balancer 120 may be configured to route incoming user traffic to each of the SPAs 110 of the single web-based application. For example, load balancer 120 may receive a request from a web browser and direct the request to a respective one of the plurality of SPAs 110 to display a requested SPA 110 via the web browser. In one embodiment, load balancer 120 may be configured to route traffic to a respective one of the plurality of SPAs 110 based on the URL sub-directory of the respective one of the plurality of SPAs 110. However, it is understood that load balancer 120 may use any technique or algorithm to route user traffic to each of the plurality of SPAs 110. In some embodiments, an artificial intelligence system may be used with load balancer 120 to route user traffic to each of the plurality of SPAs 110 based on information or activity other than URL sub-directory. For example, the artificial intelligence may be placed in front of the load balancer 120 for routing traffic to each of the SPAs 110. The artificial intelligence may further aid in A/B testing for the plurality of SPAs 110 of the single web-based application.

Figure 2:
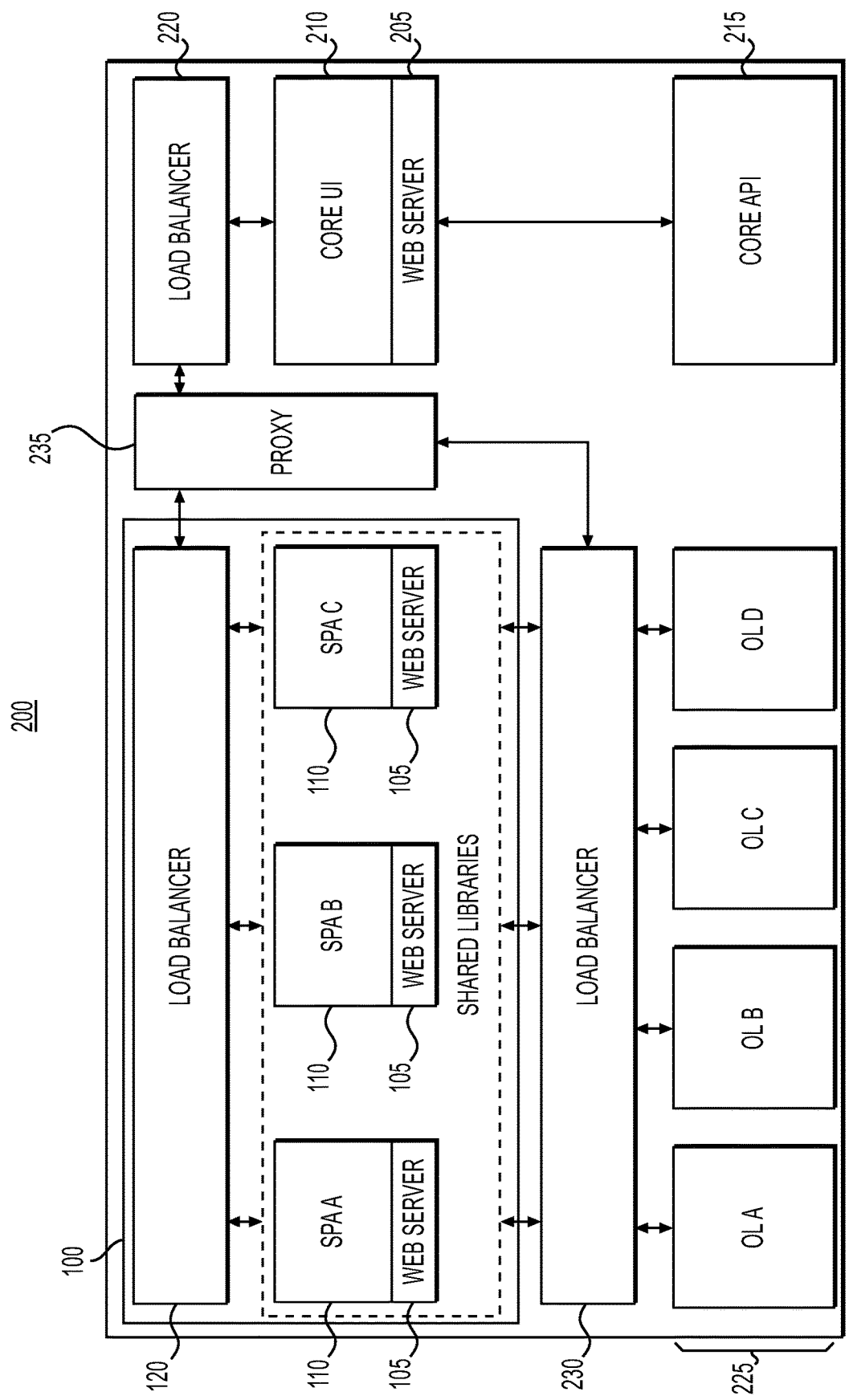
FIG. 2 depicts an exemplary embodiment of another web application architecture system including components of the web application architecture system of FIG. 1.

FIG. 2 depicts an exemplary embodiment of another web application architecture system 200 including components of web application architecture system 100. As shown in FIG. 2, the exemplary web application architecture system 200 may include implementing components of web application architecture system 100 into an existing monolithic web-based application. As such, the existing monolithic web-based application of web application architecture system 200 may include a web server 205, a core user interface (UI) 210 and a core API 215. The web server 205 may include, for example, Apache, and may host the core UI 210. The core UI 210 and the core API 215 may provide for the core components (such as the home page) of the single web-based application. A load balancer 220, such as an elastic load balancer (ELB), may be utilized to route traffic to the core UI 210 of the existing web-based application, as detailed further below. To implement independently hosted micro user interfaces (SPAs 110) for the existing web-based application, developers may utilize components of web application architecture system 100.

Accordingly, web application architecture system 200 may include similar components of web application architecture system 100. As such, web application architecture system 200 may also include a plurality of web servers 105, a plurality of SPAs 110, and a load balancer 120. Web application architecture system 200 may further include an API layer 225 for the plurality of SPAs 110. The API layer 225 may include a plurality of layers, including an orchestration layer (OL) to aggregate or compose data from multiple backend sources. The OL of the API layer 225 may include any feature-specific OL. For example, the API layer 225 may include an OL for providing platform-wide functionality, such as authentication and authorization based services. In one embodiment, the API layer 225 may include four such feature-specific OLs, such as an OL A, an OL B, an OL C, and an OL D. However, any number of feature-specific OLs may be used as necessary. A load balancer 230, such as an application load balancer (ALB), may be utilized to route traffic between the OL of the API layer 225 and the plurality of SPAs 110.

Each one of the plurality of SPAs 110 may be hosted on a single respective one of the plurality of web servers 105. In the exemplary embodiment, the plurality of web servers 105 may include NGINX and the plurality of SPAs 110 may include, for example, a SPA A, a SPA B, and a SPA C. However, any number of SPAs 110 may be developed as necessary. The plurality of SPAs 110 may be developed using one or more frameworks. As such, each of the plurality of SPAs 110 may be developed using a different framework. The one or more frameworks may include, for example, Angular, React, Vue, Meteor, Ember, Aurelia, or any other framework for developing single page applications.

The web application architecture system 200 may further include one or more shared libraries 115. The one or more shared libraries 115 may provide shared functionality for each of the plurality of SPAs 110 such that the plurality of SPAs 110 are a part of the single web-based application. Cross cutting concerns may be encapsulated by the one or more shared libraries 115. As such, each of the plurality of SPAs 110 may access the one or more shared libraries 115 for shared interface components of the single web-based application. For example, the one or more shared libraries 115 may include shared user interface components, shared platform software development kit (SDK) components, shared web application shell components, and shared authentication utilities components of the single web-based application.

The load balancer 120 may be configured to route traffic to each of the plurality of SPAs 110. Load balancer 120 may be any type of load balancer, such as an ALB, NGINX, HAProxy, or the like. Web application architecture system 200 may further include a proxy 235 to link the SPAs 110 to the core UI 210. Further, proxy 235 may proxy requests for platform-wide services (e.g., the authentication and authorization based services of the OL) to their destination. Thus, each of the plurality of SPAs 110 may be a different page within the core UI 210 of the single web-based application. As such, the core UI 210 may include a root URL and the plurality of SPAs 110 may each include a different sub-directory of the root URL. In one embodiment, load balancer 120 (e.g., an ALB) may receive a request from a web browser and route the request to a requested SPA 110 or through proxy 235 to load balancer 220 for the core UI 210 based on the root URL of the core UI 210 or a URL sub-directory of a SPA 110. Load balancer 120 may be configured to route incoming user traffic to each of the SPAs 110 of the single web-based application. For example, load balancer 120 may be configured to route traffic to a respective one of the plurality of SPAs 110 based on the URL sub-directory of the respective one of the plurality of SPAs 110. Thus, web application architecture system 200 may including components of web application architecture system 100 to create independently hosted micro user interfaces (SPAs 110) for the existing core UI 210 of a single web-based application.

Figure 3:
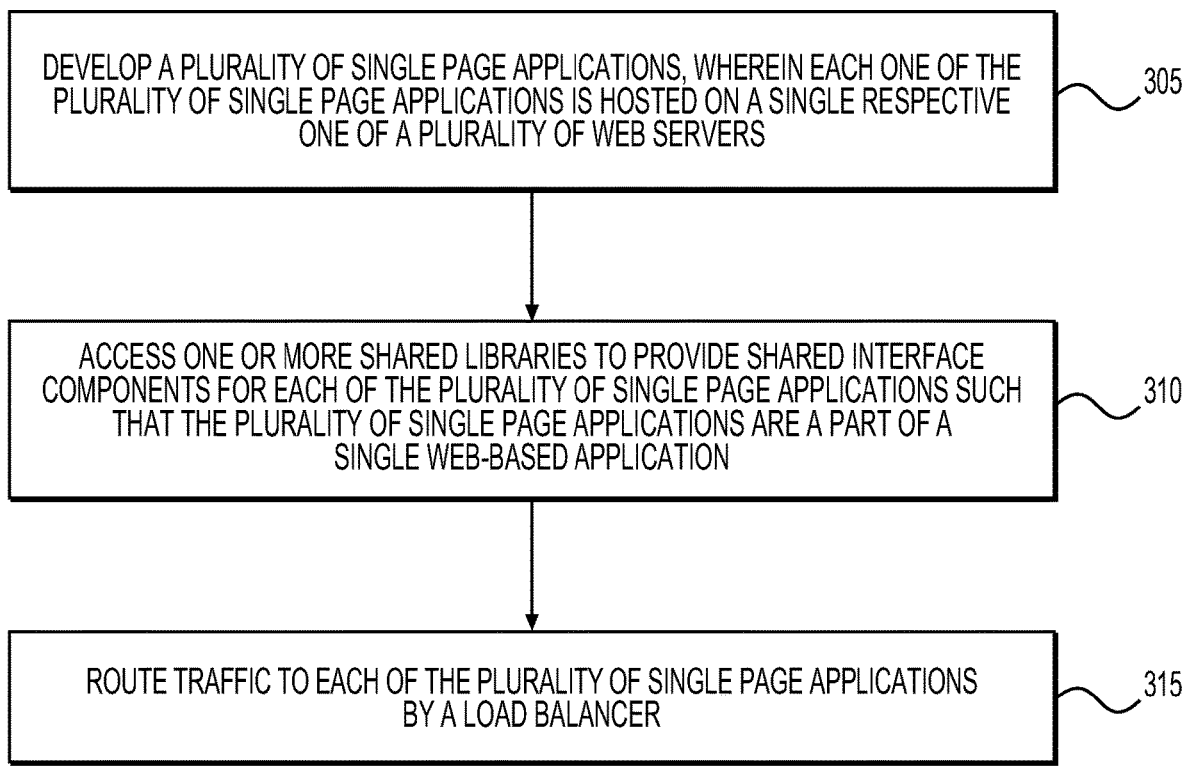
FIG. 3 depicts a flowchart of an exemplary process for developing a web application using the system of FIG. 1.

FIG. 3 depicts a flowchart of an exemplary process 300 for developing a web-based application using web application architecture system 100. In an initial step 305, developers may develop a plurality of single page applications (SPAs) 110, wherein each one of the plurality of SPAs 110 is hosted on a single respective one of a plurality of web servers 105. The developers may develop the plurality of SPAs 110 using one or more frameworks. For example, a first team of developers may develop a first SPA 110 of the plurality of SPAs 110 using a first framework, and a second team of developers may develop a second SPA 110 of the plurality of SPAs 110 using a second framework. The one or more frameworks may include, for example, Angular, React, Vue, Meteor, Ember, or Aurelia.

In step 310, the developers may access one or more shared libraries 115 to provide shared interface components for each of the plurality of SPAs 110 such that the plurality of SPAs 110 are a part of a single web-based application. The one or more shared libraries 115 may include shared user interface components, shared SDK components, shared web application shell components, and shared authentication utilities components of the single web-based application. As such, each of the plurality of SPAs 110 may provide a single user interface of the single web-based application.

In step 315, the developers may use a load balancer 120 to route traffic to each of the plurality of SPAs 110. The load balancer 120 may be configured to route traffic to each of the plurality of SPAs 110 based on URL path. For example, the web-based application may include a single root URL and the plurality of SPAs 110 may each include a different URL sub-directory of the single root URL. As such, the load balancer 120 may route traffic to a respective one of the plurality of SPAs 110 based on the URL sub-directory of the respective one of the plurality of SPAs 110.

Figure 4:
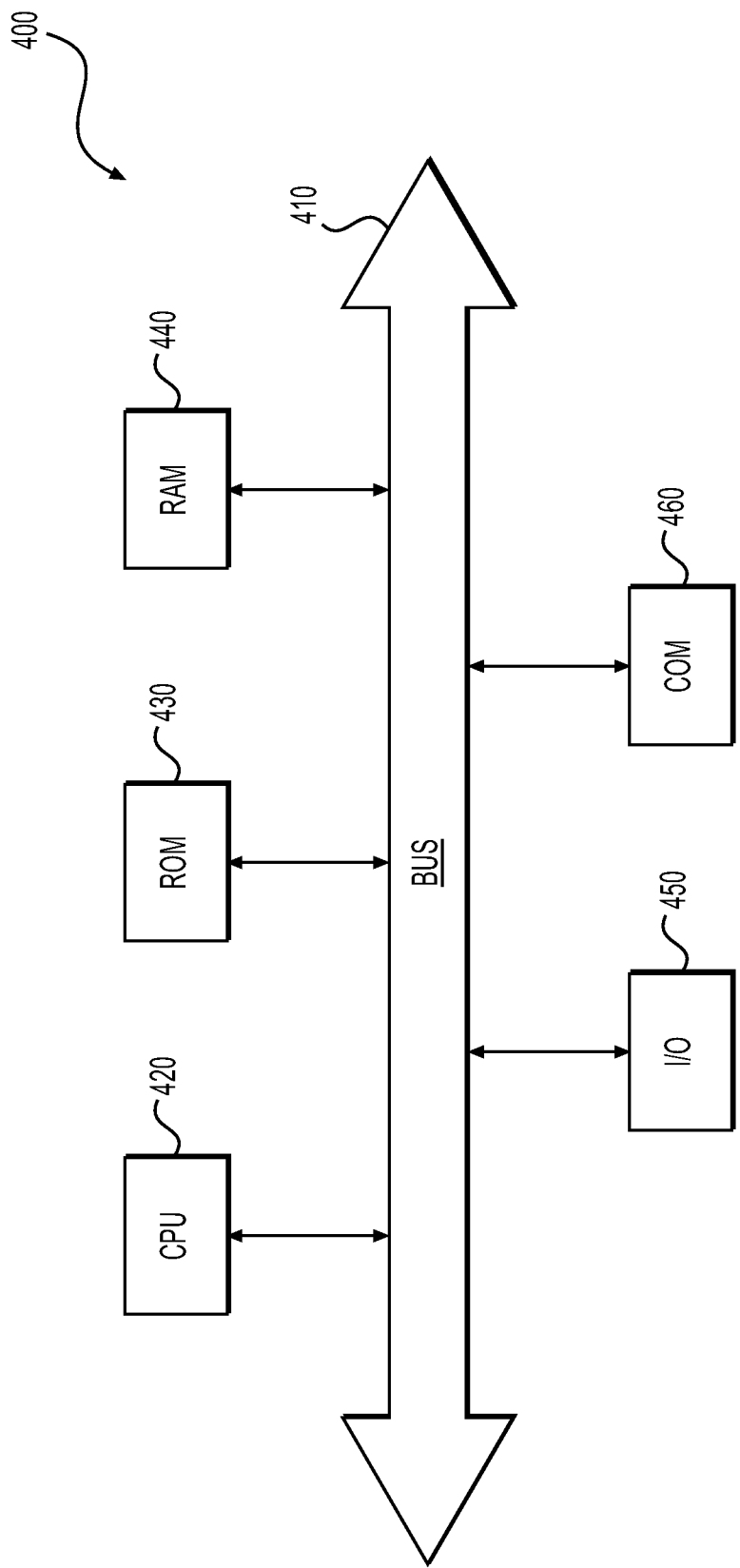
FIG. 4 depicts an example system that may execute techniques presented herein.

FIG. 4 depicts an example system 400 that may execute techniques presented herein. FIG. 4 is a simplified functional block diagram of a computer that may be configured to execute techniques described herein, according to exemplary embodiments of the present disclosure. Specifically, the computer (or "platform" as it may not a be a single physical computer infrastructure) may include a data communication interface 460 for packet data communication. The platform also may include a central processing unit ("CPU") 420, in the form of one or more processors, for executing program instructions. The platform may include an internal communication bus 410, and the platform also may include a program storage and/or a data storage for various data files to be processed and/or communicated by the platform such as ROM 430 and RAM 440, although the system 400 may receive programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of rendering a web application, the method comprising:
   receiving a request to provide a first single page application of a web application via a web browser, wherein the web application is formed from a plurality of single page applications, including the first single page application of the web application, and wherein each single page application of the plurality of single page applications of the web application is a different user interface page of the web application that is independently hosted on a different web server of a plurality of web servers;
   accessing one more shared libraries to obtain one or more shared components across each single page application of the plurality of single page applications forming the web application; and
   providing for display, via the web browser, a respective different user interface page of the web application associated with the first single page application of the web application that utilizes the one or more shared components.

2. The method of claim 1, wherein receiving the request comprises:
   receiving the request from a load balancer configured to route the request in response to receiving the request via the web browser.

3. The method of claim 2, wherein:
   the web application includes a single root Uniform Resource Locator (URL),
   each single page application of the plurality of single page applications of the web application includes a different URL sub-directory of the single root URL, and
   the load balancer is configured to route the request based on a first URL sub-directory of the single root URL associated with the first single page application of the web application.

4. The method of claim 1, wherein the web application further includes a core user interface page, and the different user interface page of each single page application of the plurality of single page applications of the web application is linked to the core user interface page.

5. The method of claim 4, wherein the core user interface page of the web application includes a single root Uniform Resource Locator (URL), and the different user interface page of each single page application of the plurality of single page applications of the web application includes a different URL sub-directory of the single root URL.

6. The method of claim 4, wherein the first single page application of the web application is developed using a first framework, and at least one other single page application of the plurality of single page applications of the web application is developed using a second framework different from the first framework.

7. The method of claim 1, wherein the one or more shared components include at least one of: shared user interface components, shared platform software development kit components, shared web application shell components, or shared authentication utilities components of the web application.

8. The method of claim 1, wherein the plurality of single page applications of the web application are independently developed using one or more frameworks.

9. A system for rendering a web application, the system comprising:
   at least one memory storing instructions; and
   at least one processor operatively connected to the at least one memory and configured to execute the instructions to perform operations, comprising:
      receiving a request to provide a first single page application of a web application via a web browser, wherein the web application is formed from a plurality of single page applications, including the first single page application of the web application, and wherein each single page application of the plurality of single page applications of the web application is a different user interface page of the web application that is independently hosted on a different web server of a plurality of web servers;

accessing one more shared libraries to obtain one or more shared components across each single page application of the plurality of single page applications forming the web application; and providing for display, via the web browser, a respective different user interface page of the web application associated with the first single page application of the web application that utilizes the one or more shared components.

10. The system of claim 9, wherein receiving the request comprises:

receiving the request from a load balancer configured to route the request in response to receiving the request via the web browser.

11. The system of claim 10, wherein:

the web application includes a single root Uniform Resource Locator (URL), each single page application of the plurality of single page applications of the web application includes a different URL sub-directory of the single root URL, and the load balancer is configured to route the request based on a first URL sub-directory of the single root URL associated with the first single page application of the web application.

12. The system of claim 9, wherein the web application further includes a core user interface page, and the different user interface page of each single page application of the plurality of single page applications of the web application is linked to the core user interface page.

13. The system of claim 12, wherein the core user interface page of the web application includes a single root Uniform Resource Locator (URL), and the different user interface page of each single page application of the plurality of single page applications of the web application includes a different URL sub-directory of the single root URL.

14. The system of claim 9, wherein the one or more shared components include at least one of: shared user interface components, shared platform software development kit components, shared web application shell components, or shared authentication utilities components of the web application.

15. The system of claim 9, wherein the plurality of single page applications of the web application are independently developed using one or more frameworks.

16. The system of claim 15, wherein the first single page application of the web application is developed using a first framework, and at least one other single page application of the plurality of single page applications of the web application is developed using a second framework different from the first framework.

17. A method of rendering a web application, the method comprising:

receiving a request to provide a first single page application of a web application via a web browser, wherein the web application includes a core user interface page and a plurality of different user interface pages corresponding to a plurality of single page applications, including the first single page application of the web application, that are independently hosted on different web servers of a plurality of web servers;

accessing one more shared libraries to obtain one or more shared components across each single page application of the plurality of single page applications forming the web application; and providing for display, via the web browser, a first different user interface page of the plurality of different user interface pages corresponding to the first single page application of the web application that utilizes the one or more shared components.

18. The method of claim 17, wherein the core user interface page of the web application includes a single root Uniform Resource Locator (URL), and each different user interface page of the plurality of different user interface pages includes a different URL sub-directory of the single root URL.

19. The method of claim 18, wherein receiving the request comprises:

receiving the request from a load balancer configured to route the request in response to receiving the request via the web browser based on a first URL sub-directory of the single root URL associated with the first different user interface page of the plurality of different user interface pages.

20. The method of claim 17, wherein the one or more shared components include at least one of: shared user interface components, shared platform software development kit components, shared web application shell components, or shared authentication utilities components of the web application.

* * * * *